United States Patent
Chuang

(10) Patent No.: US 7,766,201 B2
(45) Date of Patent: Aug. 3, 2010

(54) DEVICE FOR ATTACHING A BAG TO A LUGGAGE CARRIER

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 1022 days.

(21) Appl. No.: 11/465,034

(22) Filed: Aug. 16, 2006

(65) Prior Publication Data

US 2008/0041901 A1 Feb. 21, 2008

(51) Int. Cl.
*B62J 9/00* (2006.01)
*B62J 11/00* (2006.01)
*B62J 7/00* (2006.01)

(52) U.S. Cl. ................. 224/458; 224/459; 224/430; 224/449

(58) Field of Classification Search ............ 224/458, 224/459, 430, 449; 248/690, 126; 211/7, 211/124

See application file for complete search history.

(56) References Cited

U.S. PATENT DOCUMENTS

| 2,783,927 | A | * | 3/1957 | Harley | 224/430 |
| 3,157,327 | A | * | 11/1964 | Karbin | 224/429 |
| 3,937,374 | A | * | 2/1976 | Hine, Jr. | 224/430 |
| 4,081,117 | A | * | 3/1978 | Crane | 224/441 |
| 4,096,980 | A | * | 6/1978 | Clow | 224/441 |
| 4,244,496 | A | * | 1/1981 | Litz | 224/413 |
| 5,435,471 | A | * | 7/1995 | Chuang | 224/419 |
| 5,579,971 | A | * | 12/1996 | Chuang | 224/430 |
| 5,673,833 | A | * | 10/1997 | Ortlieb | 224/425 |
| 6,053,384 | A | * | 4/2000 | Bachman | 224/430 |
| 6,293,450 | B1 | * | 9/2001 | Aron | 224/430 |
| 7,207,470 | B2 | * | 4/2007 | Akita et al. | 224/413 |
| 2005/0150921 | A1 | * | 7/2005 | Schneider | 224/413 |
| 2006/0163302 | A1 | * | 7/2006 | Knoch et al. | 224/413 |

OTHER PUBLICATIONS

Taiwanese Patent Publication No. 249398, Jun. 11, 1995, 4 pages.

* cited by examiner

*Primary Examiner*—Nathan J Newhouse
*Assistant Examiner*—Lester L Vanterpool
(74) *Attorney, Agent, or Firm*—Alan Kamrath; Kamrath & Associates PA

(57) ABSTRACT

A device for attaching a bag to a luggage carrier of a bicycle includes a beam secured to the bag, two hooks installed on the beam to hook the luggage carrier and a restraining unit. The restraining unit includes a plate formed on the beam, a cover attached to the plate, at least one latch movably installed on the plate, at least one elastic element compressed between the cover and the latch so that an end of the latch is exposed from the plate for restraining the luggage carrier, a shackle movable on the plate between a first position for keeping the end of the latch exposed from the plate and a second position for allowing the retreat of the end of the latch into the plate and a elastic element compressed between the cover and the shackle for keeping the shackle in the first position.

20 Claims, 16 Drawing Sheets

DEVICE FOR ATTACHING A BAG TO A LUGGAGE CARRIER

BACKGROUND OF INVENTION

1. Field of Invention

The present invention relates to a bicycle and, more particularly, to a device for attaching a bag to a luggage carrier of a bicycle.

2. Related Prior Art

There are various bags such as knapsacks, shoulder bags and hand bags. It is generally inconvenient and dangerous for a rider to carry a knapsack, a shoulder bag or a hand bag.

A rider may tie a bag to a luggage carrier of a bicycle. However, the rider might lose the bag while turning since the bicycle is tilted and the area of the luggage carrier is small. The rider has to pay attention to the bag tied to the luggage carrier while turning. This is a distracting and dangerous practice.

In Taiwanese Patent Publication No. 249398 issued to the applicant of the present application, there is disclosed a conventional device for attaching a bag to a luggage carrier of a bicycle. The conventional device includes a beam 10 secured to the bag, two hooks 14 attached to the beam 10 for contact with the luggage carrier from a side and a restraining unit 20 attached to the beam 10 for contact with the luggage carrier from an opposite side. However, the hooks 14 and the restraining unit 20 might be disengaged from the luggage carrier when the bicycle jolts along a rough road.

Therefore, the present invention is intended to obviate or at least alleviate the problems encountered in prior art.

SUMMARY OF INVENTION

According to the present invention, a device for attaching a bag to a luggage carrier of a bicycle includes a beam secured to the bag, two hooks installed on the beam to hook the luggage carrier and a restraining unit. The restraining unit includes a plate formed on the beam, a cover attached to the plate, at least one latch movably installed on the plate, at least one elastic element compressed between the cover and the latch so that an end of the latch is exposed from the plate for restraining the luggage carrier, a shackle movable on the plate between a first position for keeping the end of the latch exposed from the plate and a second position for allowing the retreat of the end of the latch into the plate and a elastic element compressed between the cover and the shackle for keeping the shackle in the first position.

The primary advantage of the device according to the present invention is the security in the operation thereof.

Other advantages and features of the present invention will become apparent from the following description referring to the drawings.

BRIEF DESCRIPTION OF DRAWINGS

The present invention will be described through detailed illustration of four embodiments referring to the drawings.

DETAILED DESCRIPTION OF EMBODIMENTS

Figure 1:
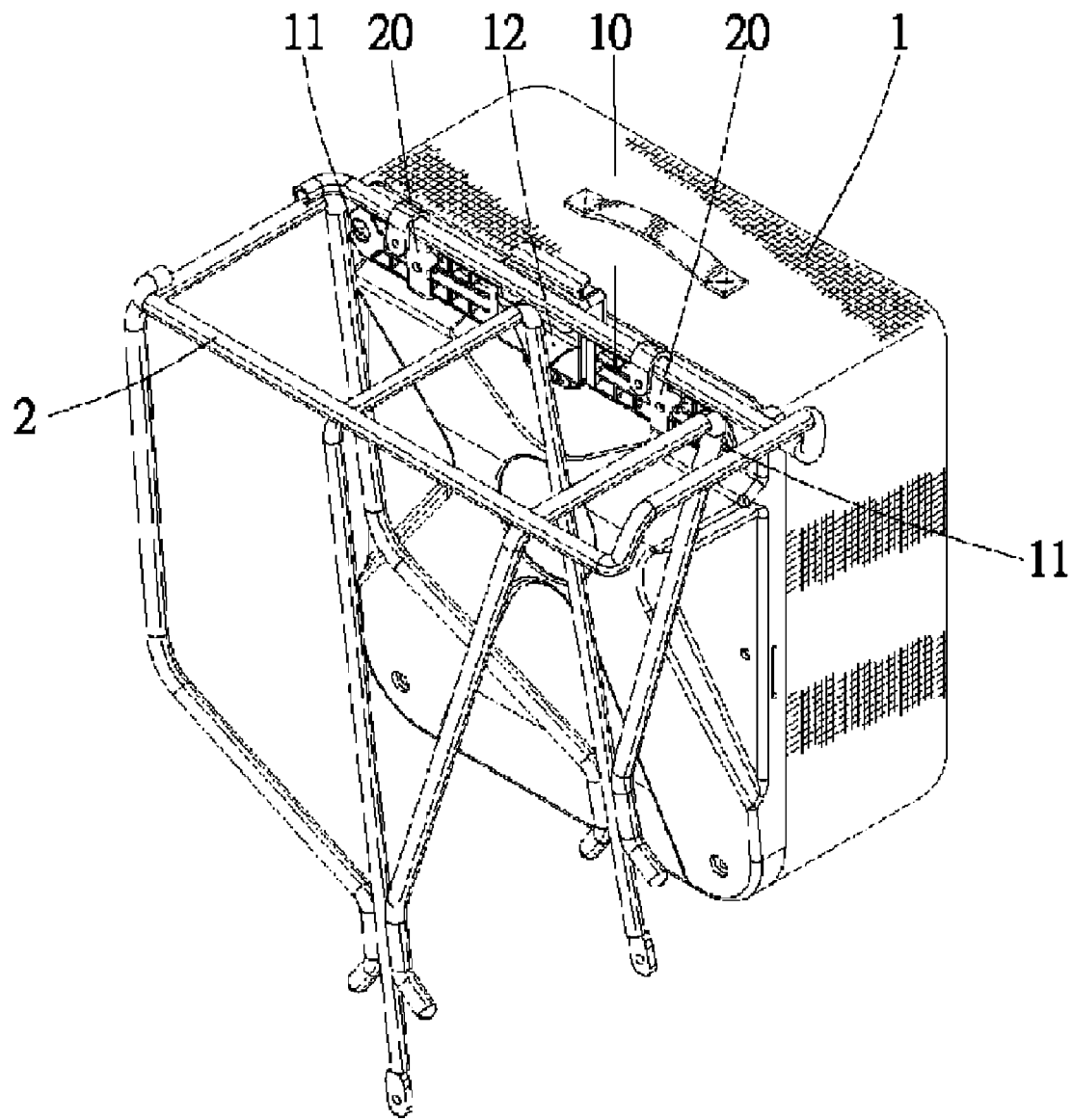
FIG. 1 is a perspective view of a device for attaching a bag to a luggage carrier of a bicycle according to the first embodiment of the present invention.
Figure 2:
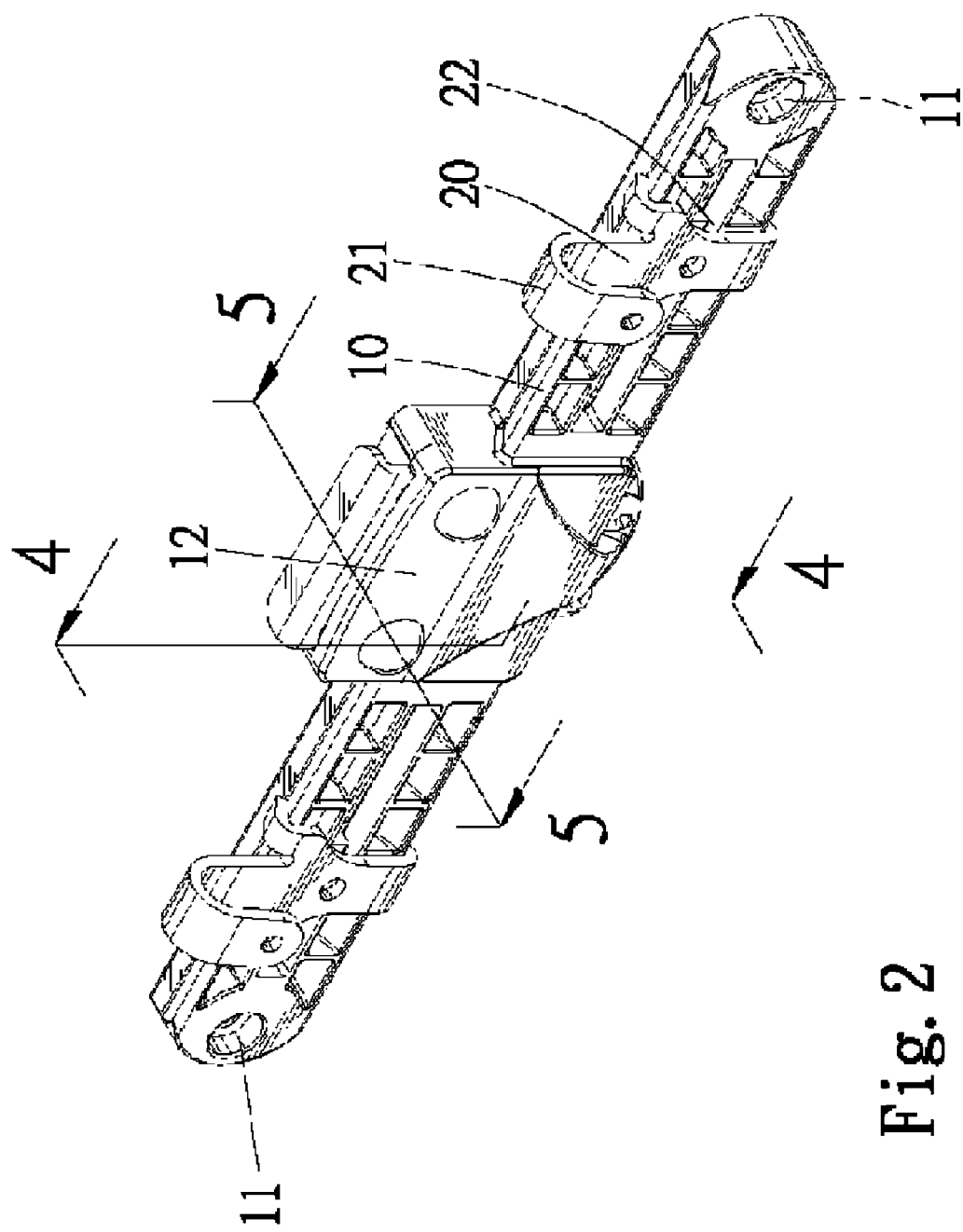
FIG. 2 is an enlarged perspective view of the device shown in FIG. 1.
Figure 3:
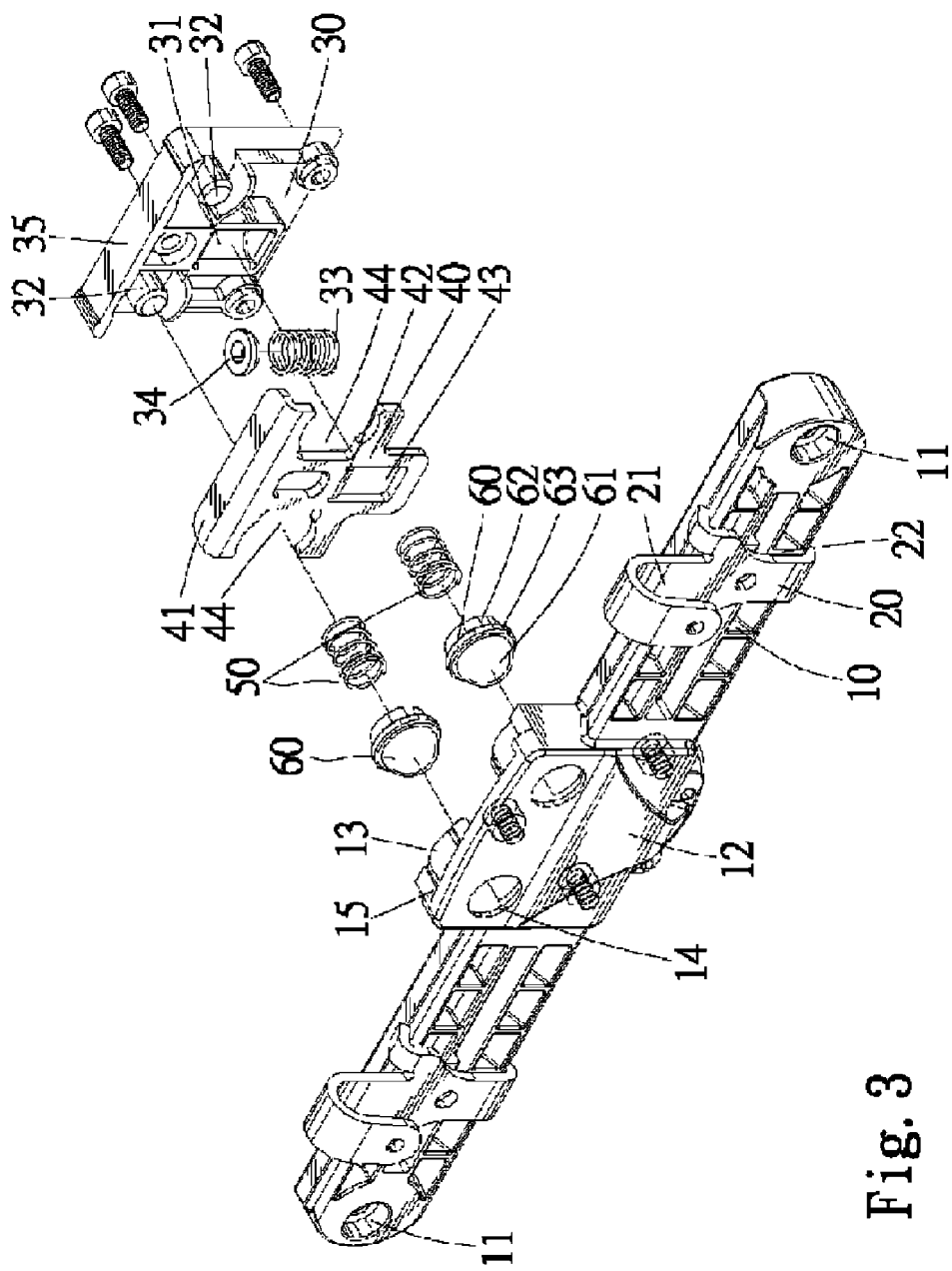
FIG. 3 is an exploded view of the device shown in FIG. 2.

Referring to FIGS. 1 through 4, a bag 1 is attached to a luggage carrier 2 of a bicycle by a device according to a first embodiment of the present invention. The device includes a beam 10 secured to the bag 1, two hooks 20 installed on the beam 10 and a restraining unit installed on the beam 10.

The beam 10 includes a dovetail profile and defines two apertures 11 through which two fasteners can be driven into the bag 1 so that the beam 10 is secured to the bag 1.

Each of the hooks 20 includes a retroflex portion 21 at an end and a dovetail groove 22 in an opposite end. The beam 10 is inserted in the dovetail grooves 22 of the hooks 20 so that the hooks 20 are movably installed on the beam 10.

The restraining unit includes a plate 12, a cover 30, two latches 60, two elastic elements 50, a shackle 40 and an elastic element 33. The plate 12 is formed on the beam 10 between the apertures 11. The cover 30 is attached to the plate 12. The shackle 40 is movably installed between the plate 12 and the cover 30. The elastic element 33 is compressed between the cover 30 and the shackle 40. Each of the latches 60 includes a first end 61 and a second end 62. Each of the elastic elements 50 is compressed between the cover 30 and the second end 62 of a related one of the latches 60. Hence, the first end 61 of each of the latches 60 is normally exposed from the plate 12.

Two collars 13 are formed on the plate 12. Each of the collars 13 defines a stepped space 14 with an annular shoulder 141 formed between two portions. The plate 12 defines a slot 15 in communication with the stepped spaces 14.

The shackle 40 includes a button 41 formed along an upper edge, a tab 42 formed on a side, a window 43 defined near the tab 42 and two cutouts 44 defined therein. The shackle 40 is made of a sheet. A U-shaped slot is made in the sheet. The portion of the sheet defined by the U-shaped slot is bent and becomes the tab 42, thus leaving the window 43 in the shackle 40. The shackle 40 is inserted in the slot 15 so that the cutouts 44 are in communication with the stepped spaces 14.

The first end 61 of each of the latches 60 is rounded while the second end 62 of the same is concave. Each of the latches 60 includes an annular flange 63 between the ends 61 and 62. The first ends 61 of the latches 60 are exposed from the stepped spaces 14. The annular flanges 63 are inserted through the cutouts 44. The second ends 62 of the latches 60 are located within the stepped spaces 14. The annular flanges 63 are normally restrained between the annular shoulders 141 and the edges of the cutouts 44.

The cover 30 includes a space 31 defined in a side, two rods 32 formed on the side and a cavity 35 defined in an upper face for receiving the button 41.

Each of the elastic elements 50 includes a first end inserted in the second end 62 of a related one of the latches 60 and a second end installed around a related one of the rods 32.

The elastic element 33 is installed in the space 31 and the window 43. A pusher 34 is also installed in the space 31 and the window 43. The pusher 34 includes a lower end 341 and an upper end 342 larger than the lower end 341. A lower end of the elastic element 33 is in contact with the floor of the space 31. The lower end 341 of the pusher 34 is inserted in an upper end of the elastic element 33 while the upper end 342 of the same is located against the tab 42. The cover 30 is connected to the plate 12 by a plurality of fasteners such as threaded bolts and nuts engaged with the threaded bolts.

Figure 4:
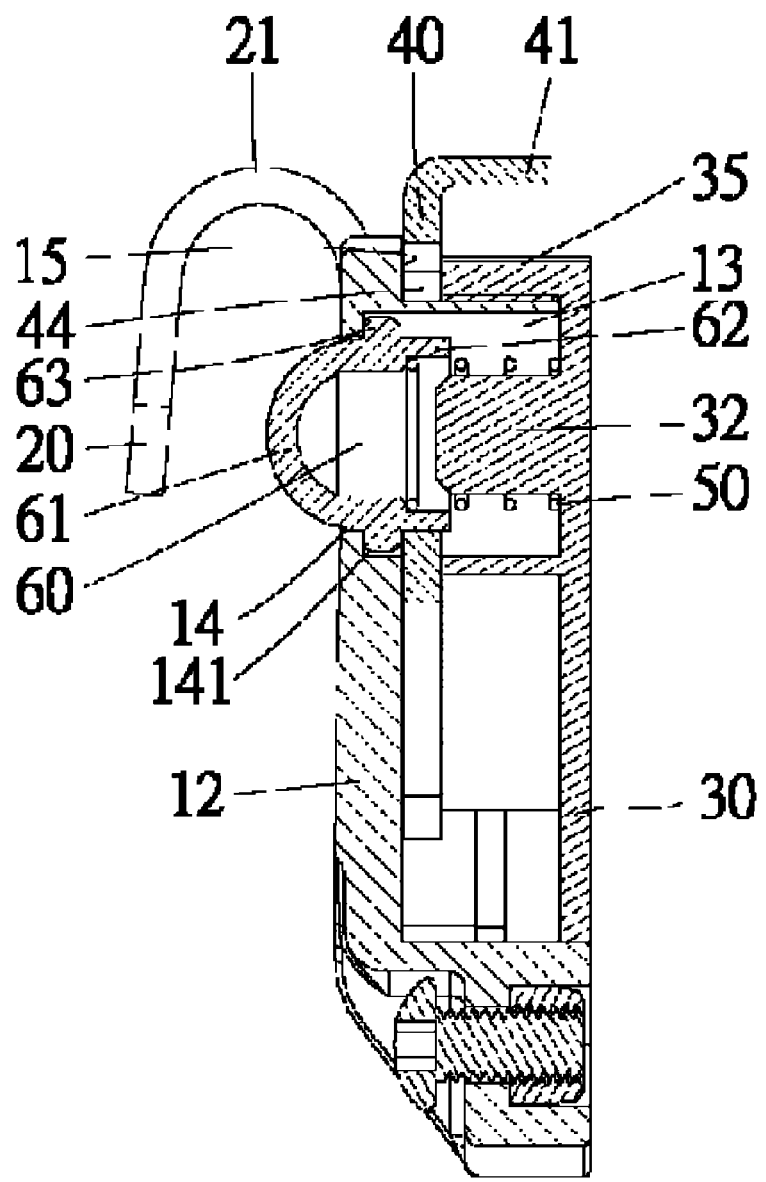
FIG. 4 is a cross-sectional view of the device taken along a line 4-4 in FIG. 2.
Figure 5:
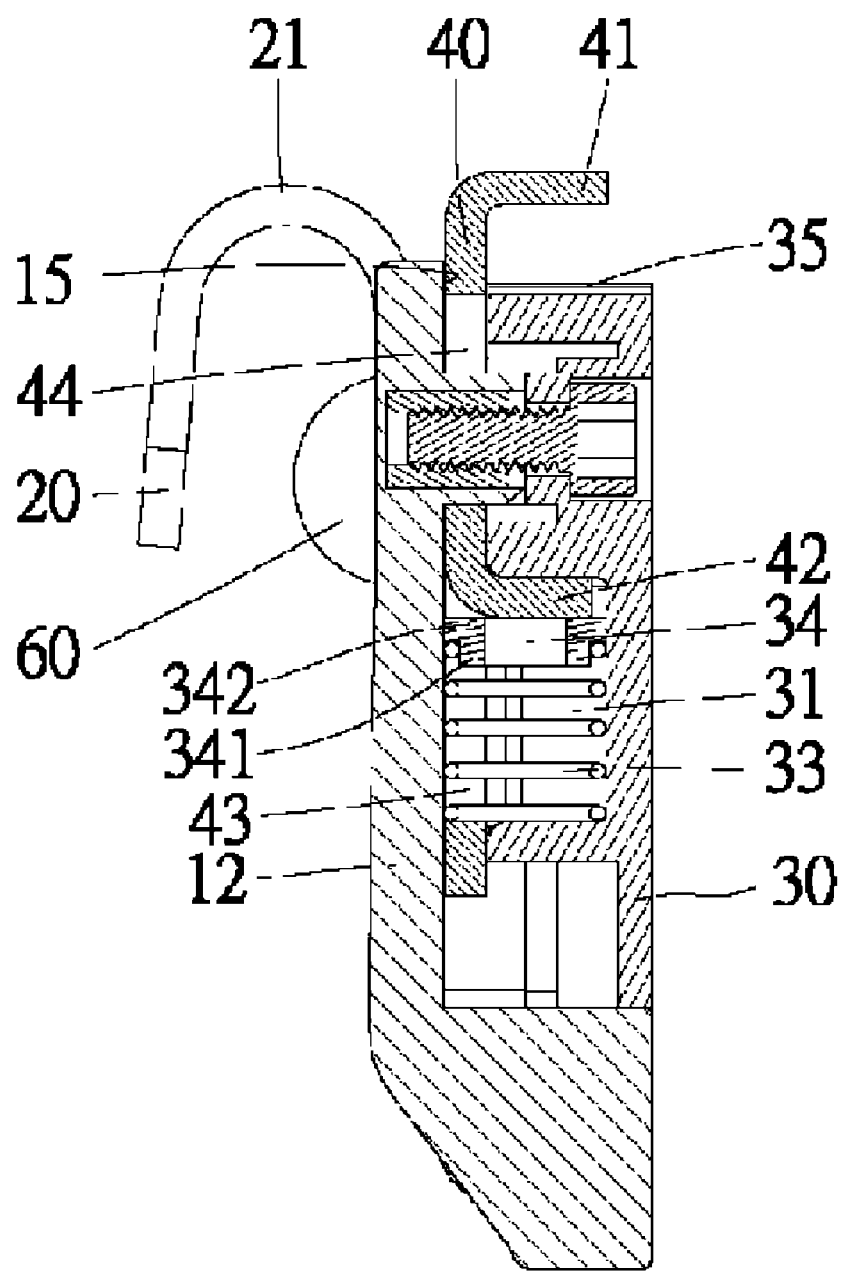
FIG. 5 is a cross-sectional view of the device taken along a line 5-5 in FIG. 2.

Referring to FIGS. 4 and 5, the shackle 40 is retained in an upper position relative to the cover 30 because of the elastic element 33. The annular flanges 63 are restrained between the annular shoulders 141 and the edges of the cutouts 44. The first ends 61 of the latches 60 are kept exposed from the stepped spaces 14. That is, the first ends 61 of the latches 60 cannot be retreated into the stepped spaces 14.

Figure 6:
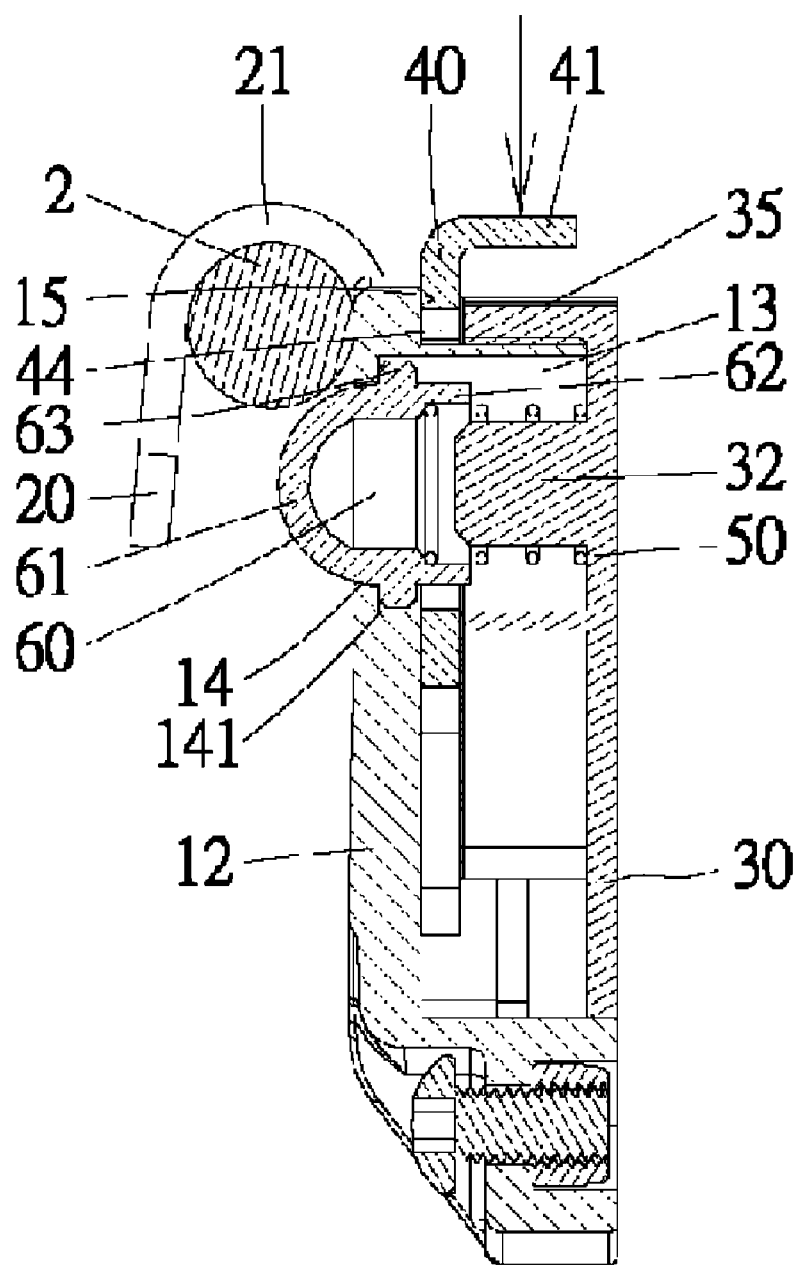
FIG. 6 is a cross-sectional view of the device in another position than shown in FIG. 4.
Figure 7:
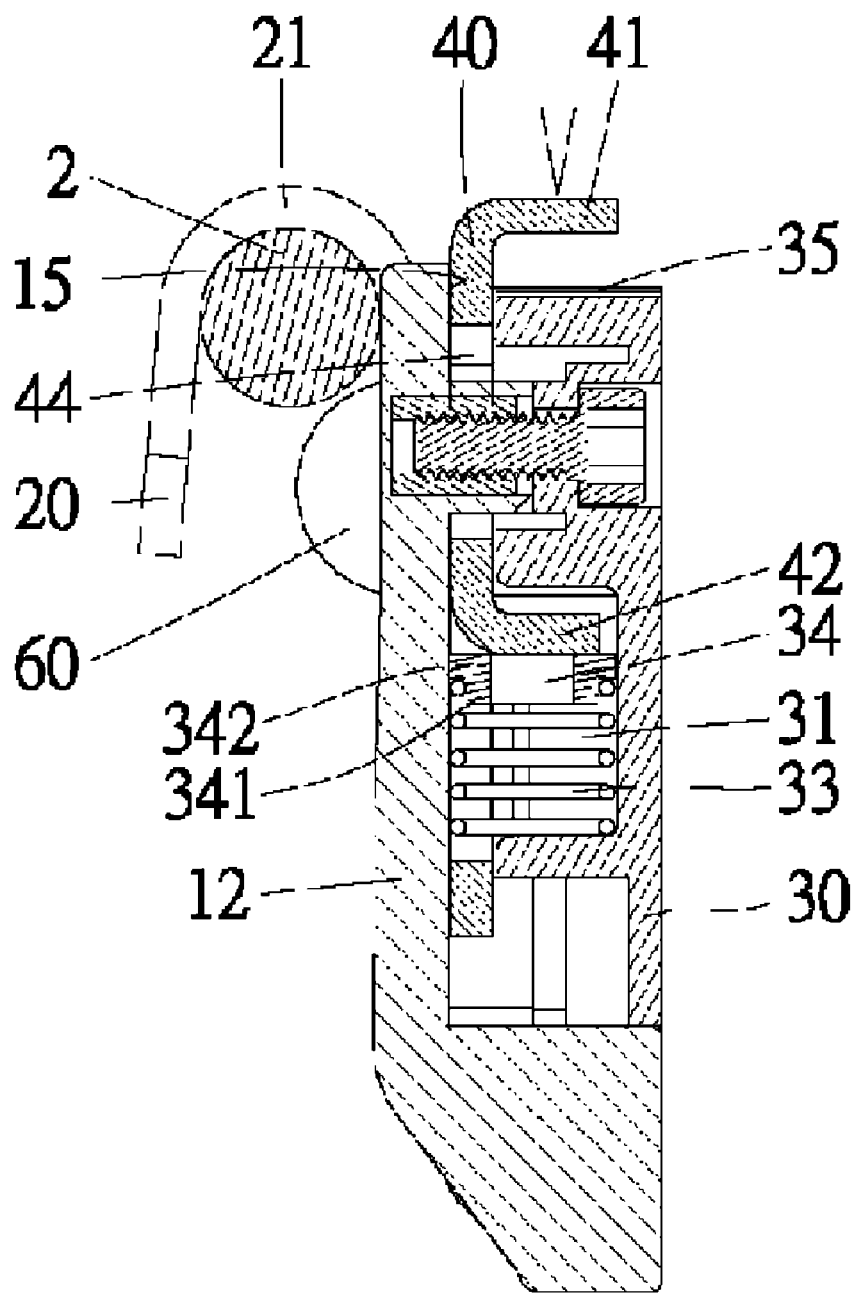
FIG. 7 is a cross-sectional view of the device in another position than shown in FIG. 5.
Figure 8:
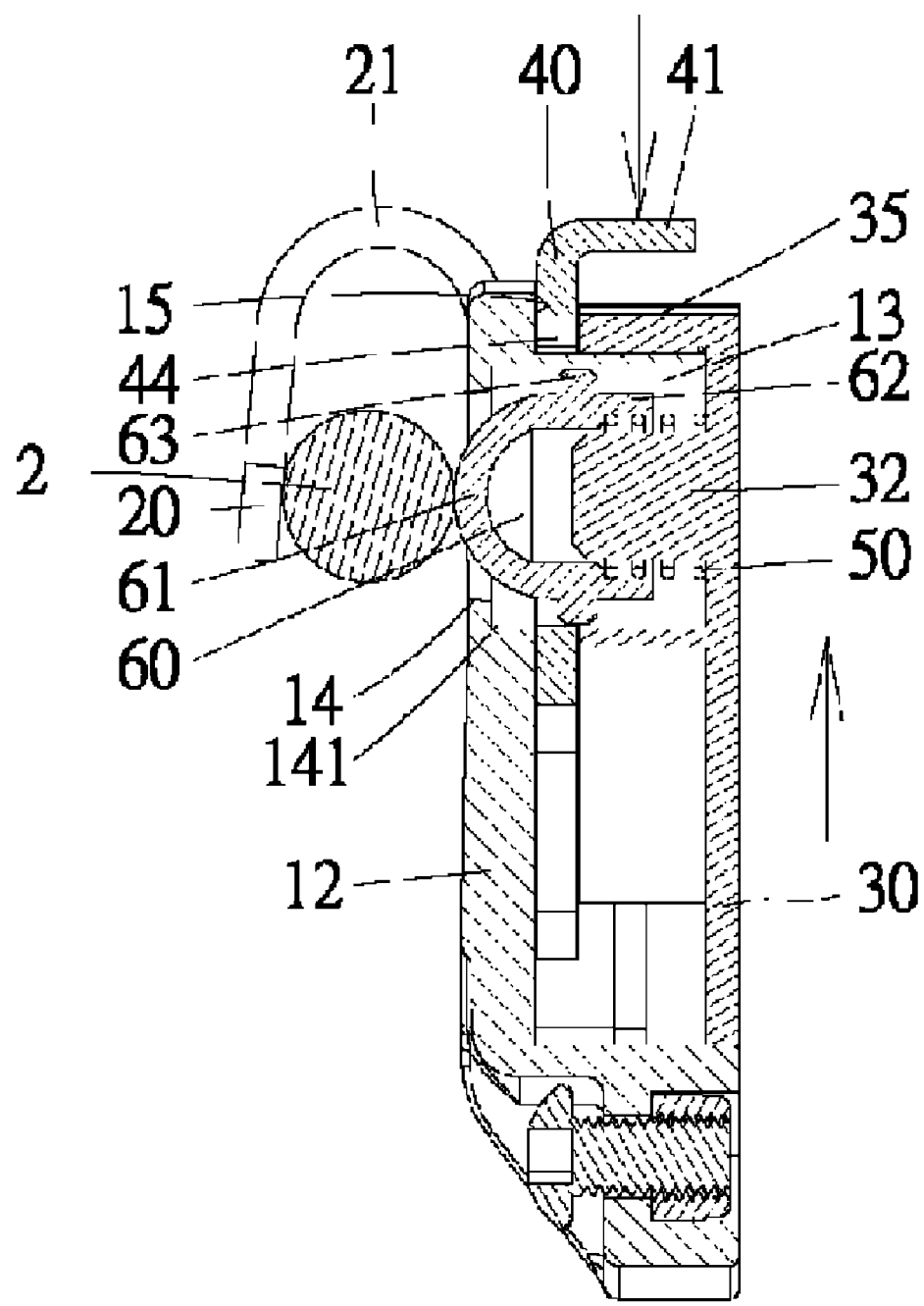
FIG. 8 is a cross-sectional view of the device in another position than shown in FIG. 6.

Referring to FIGS. 6 through 8, the shackle 40 is pushed to a lower position relative to the cover 30. The cutouts 44 are aligned with the stepped spaces 14 so that the edges of the former cannot restrain the annular flange 63. The first ends 61 of the latches 60 can be retreated into the stepped spaces 14. The first ends 61 of the latches 60 can be moved past the luggage carrier 2 so that the hooks 20 can be hooked on and removed from the luggage carrier 2.

Figure 9:
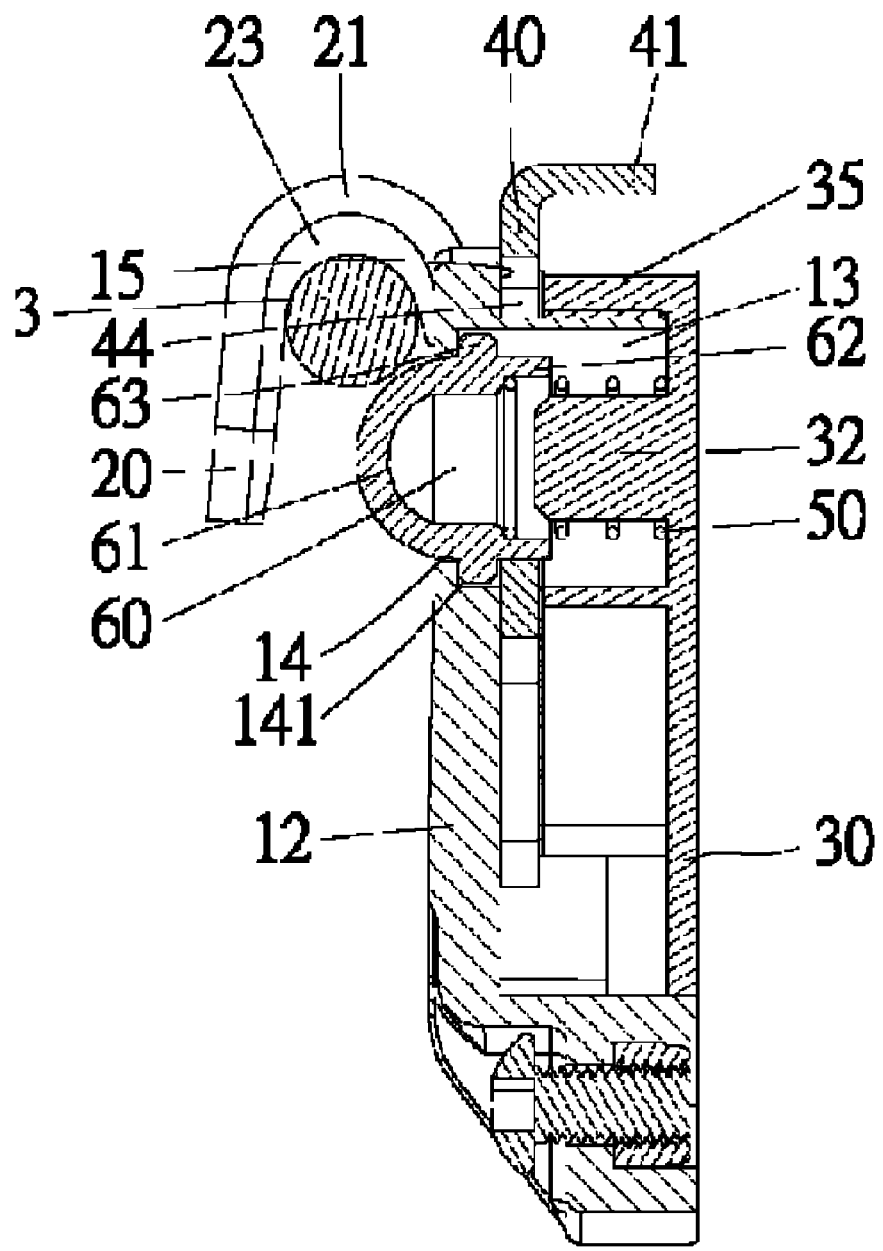
FIG. 9 is a cross-sectional view of a device for attaching a bag to a luggage carrier of a bicycle according to the second embodiment of the present invention.
Figure 10:
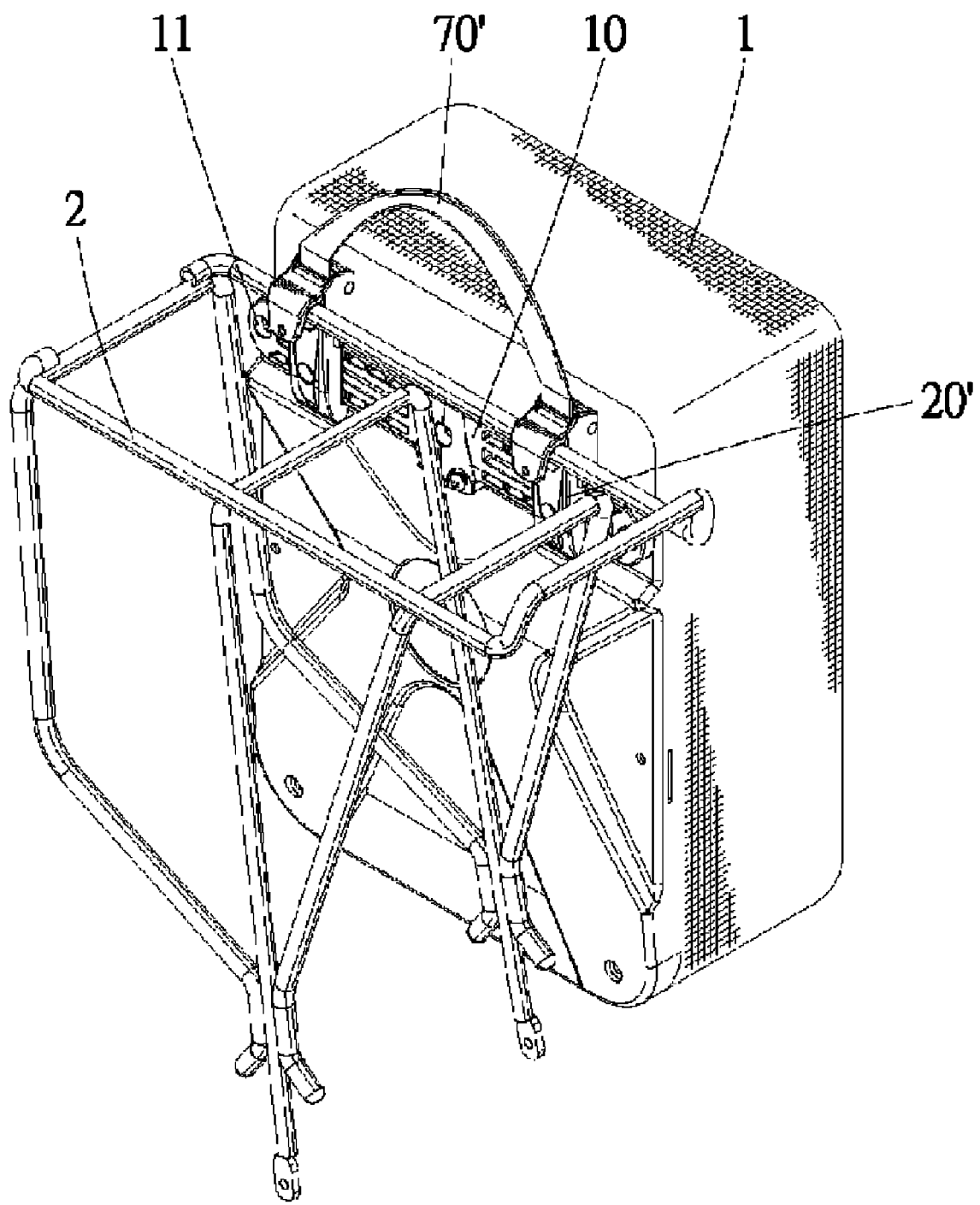
FIG. 10 is a perspective view of a device for attaching a bag to a luggage carrier of a bicycle according to the third embodiment of the present invention.
Figure 11:
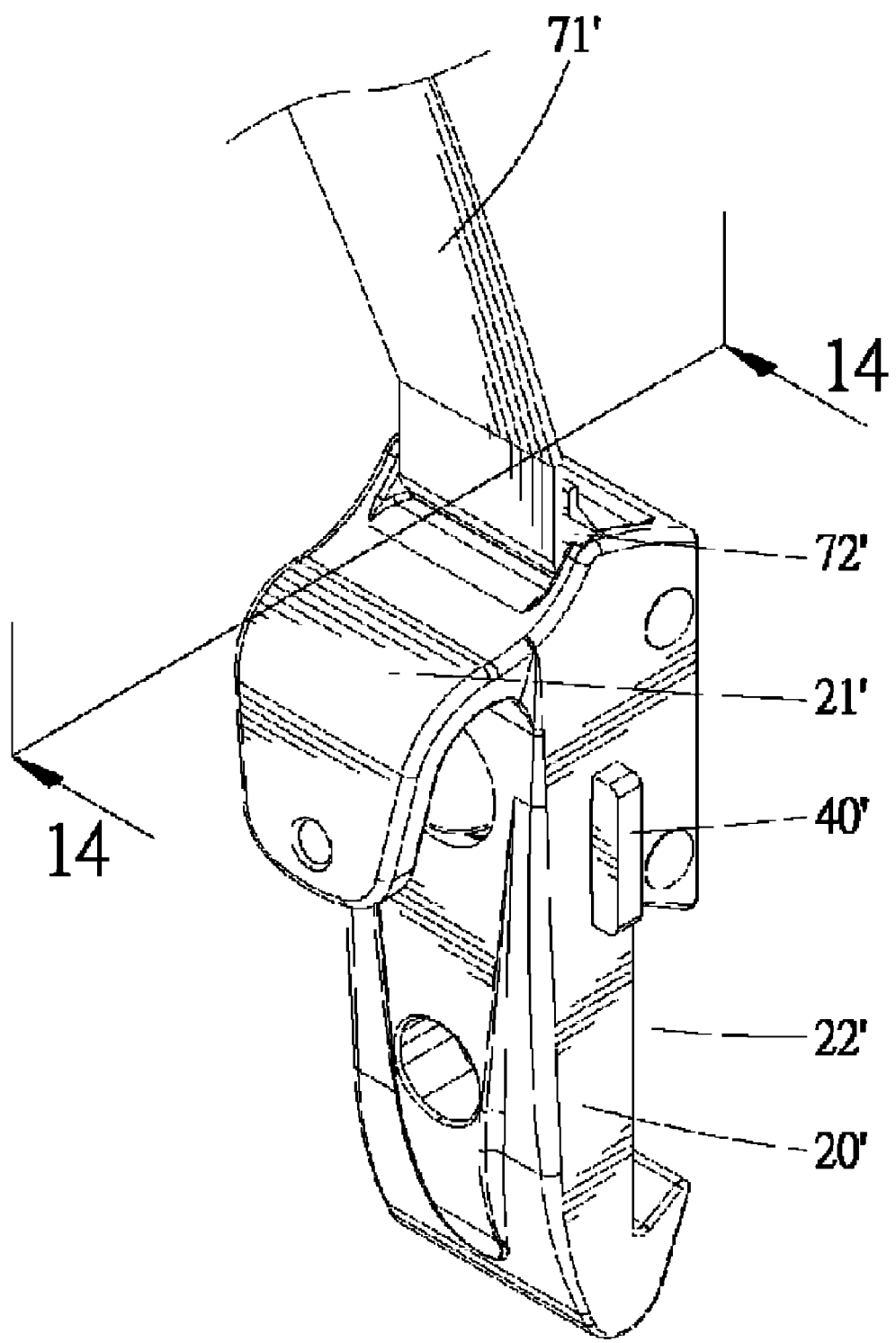
FIG. 11 is an enlarged perspective partial view of the device shown in FIG. 10.
Figure 12:
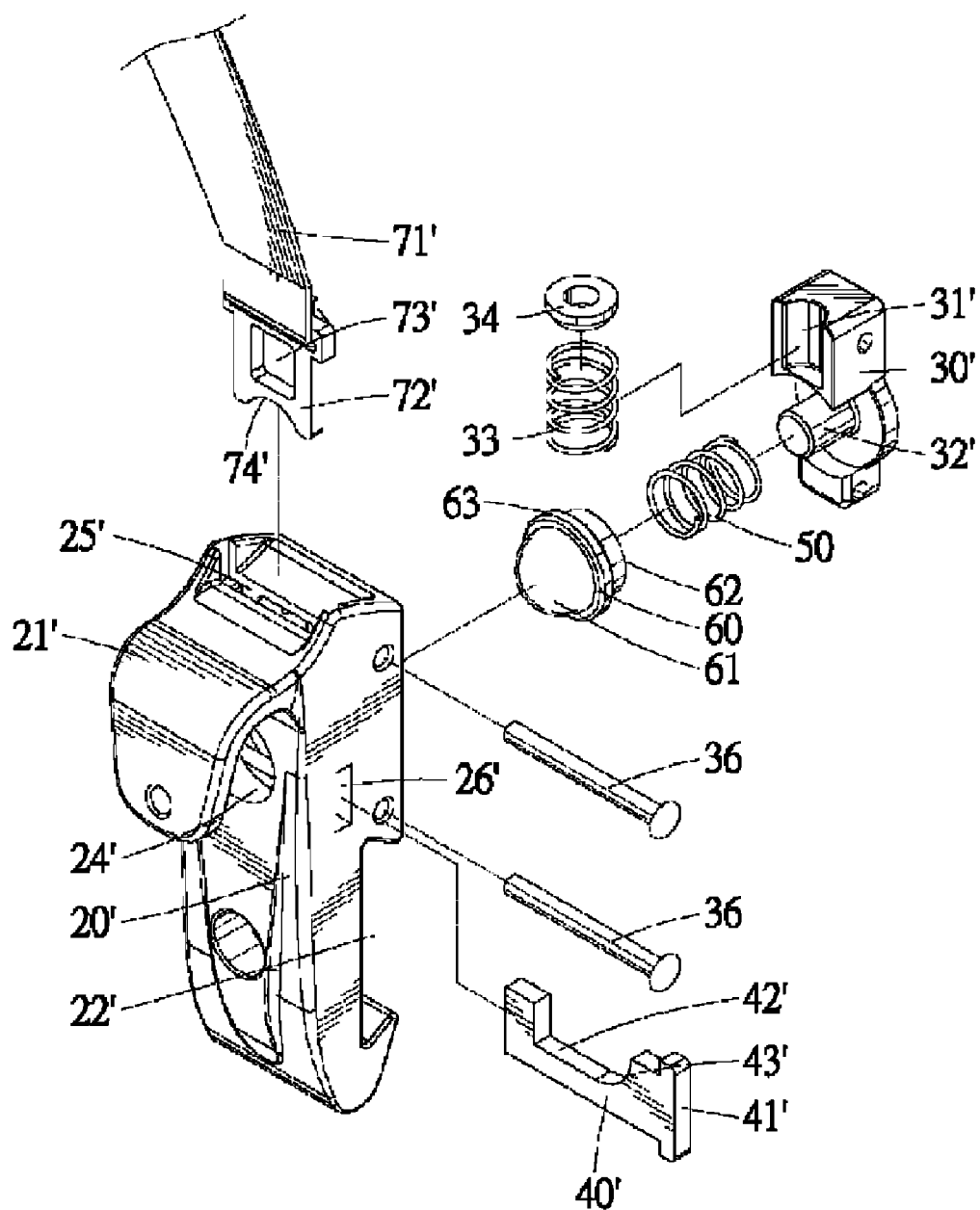
FIG. 12 is an exploded partial view of the device shown in FIG. 11.

Referring to FIG. 9, there is shown a device according to a first embodiment of the present invention. The second embodiment is like the first embodiment except including an auxiliary hook 23 attached to each of the hooks 20 so that it can be hooked on a smaller luggage carrier.

Referring to FIGS. 10 through 15, there is shown a device according to a third embodiment of the present invention. The third embodiment includes the beam 10 secured to the bag 1 and two holding devices for engagement with the luggage carrier 2.

Each of the holding devices includes a hook 20', a cover 30', a lower shackle 40', an upper shackle 72', a latch 60, an elastic element 50 and an elastic element 33.

The hook 20' includes a retroflex portion 21' formed on a side, a dovetail groove 22' defined in an opposite side, a stepped space 24' defined therein, a slot 25' in communication with the stepped space 24' and a slot 26' in communication with the stepped space 24'. The stepped space 24' includes a first portion and a second portion larger than the first portion, thus forming an annular shoulder 241' between the first and second portions.

The upper shackle 72' includes a window 73' defined therein and an arched lower edge 74' formed thereon. The upper shackle 72' is inserted into the slot 25'.

The lower shackle 40' includes a button 41' formed at an end and an upper edge including a rectilinear portion 42' and an arched portion 43'. The lower shackle 40' is inserted into the slot 26'.

The first end 61 of the latch 60 is exposed from the stepped space 24'. The annular flange 63 is inserted through a window defined between the arched lower edge 74' of the upper shackle 72' and the upper edge of the lower shackle 40'. The second end 62 of the latch 60 is located in the stepped space 24'.

The elastic element 33 is located in the window 73' and the stepped space 24'. A pusher 34 is also located in the window 73' and the stepped space 24'. The upper end 342 of the pusher 34 is located against the ceiling of the stepped space 24' while the lower end 341 of the same is inserted in the upper end of the elastic element 33. The lower end of the elastic element 33 is in contact with a lower edge of the window 73'.

The cover 30' includes a space 31' defined therein and a rod 32' formed thereon. The elastic element 33 is located in the space 31'. One of the ends of the elastic element 50 is installed around the rod 32' while the other end of the same is inserted in the second end 62 of the latch 60. The cover 30' is secured to the hook 20' by a plurality of fasteners 36 such as pins and rivets.

Figure 13:
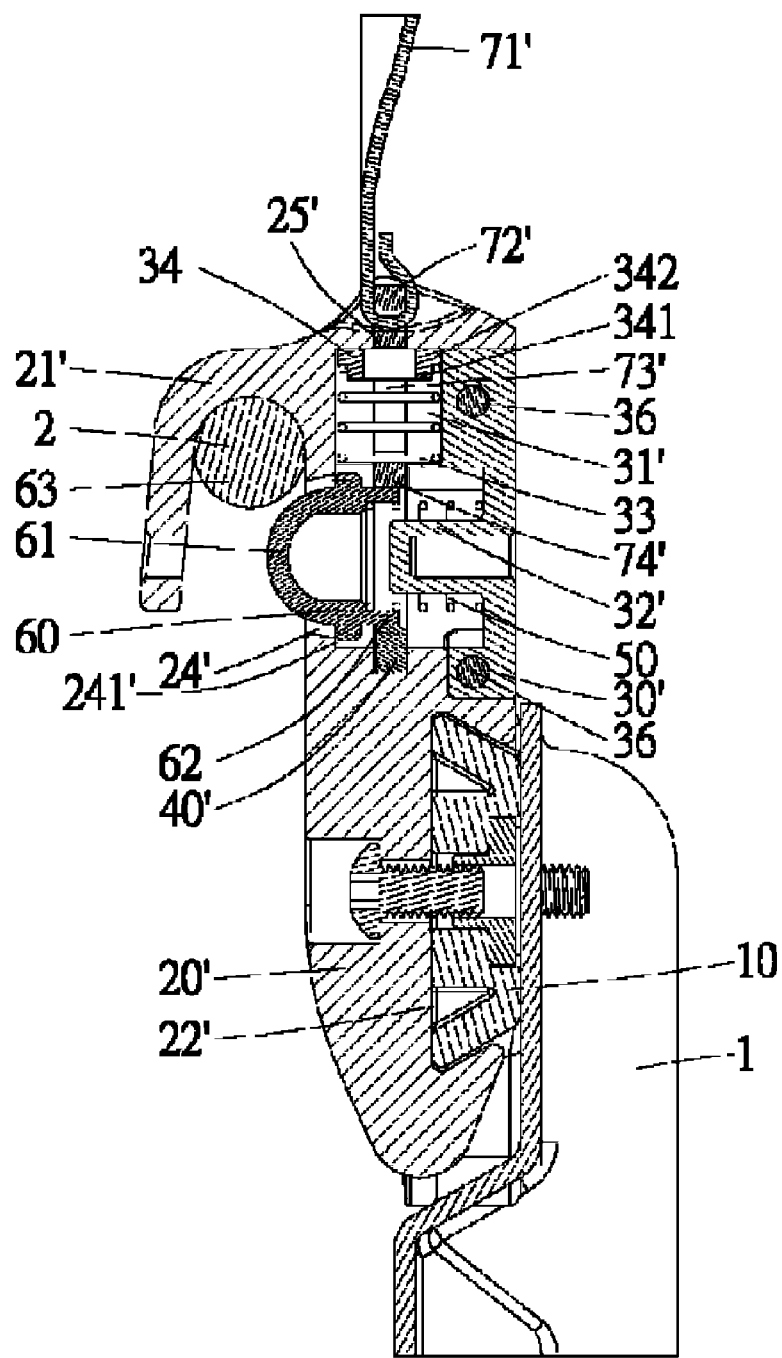
FIG. 13 is a cross-sectional view of the device taken along a line 13-13 in FIG. 11.

Referring to FIG. 13, the upper shackle 72' is kept in a lower position by the elastic element 33. The lower shackle 40 is in a first position. The annular flange 63 is restrained by the annular shoulder 241' on one hand and confined by the arched lower edge 74' of the upper shackle 72' and the upper edge of the lower shackle 40' on the other hand. The first end 61 of the latch 60 cannot be retreated into the stepped space 24'.

Figure 14:
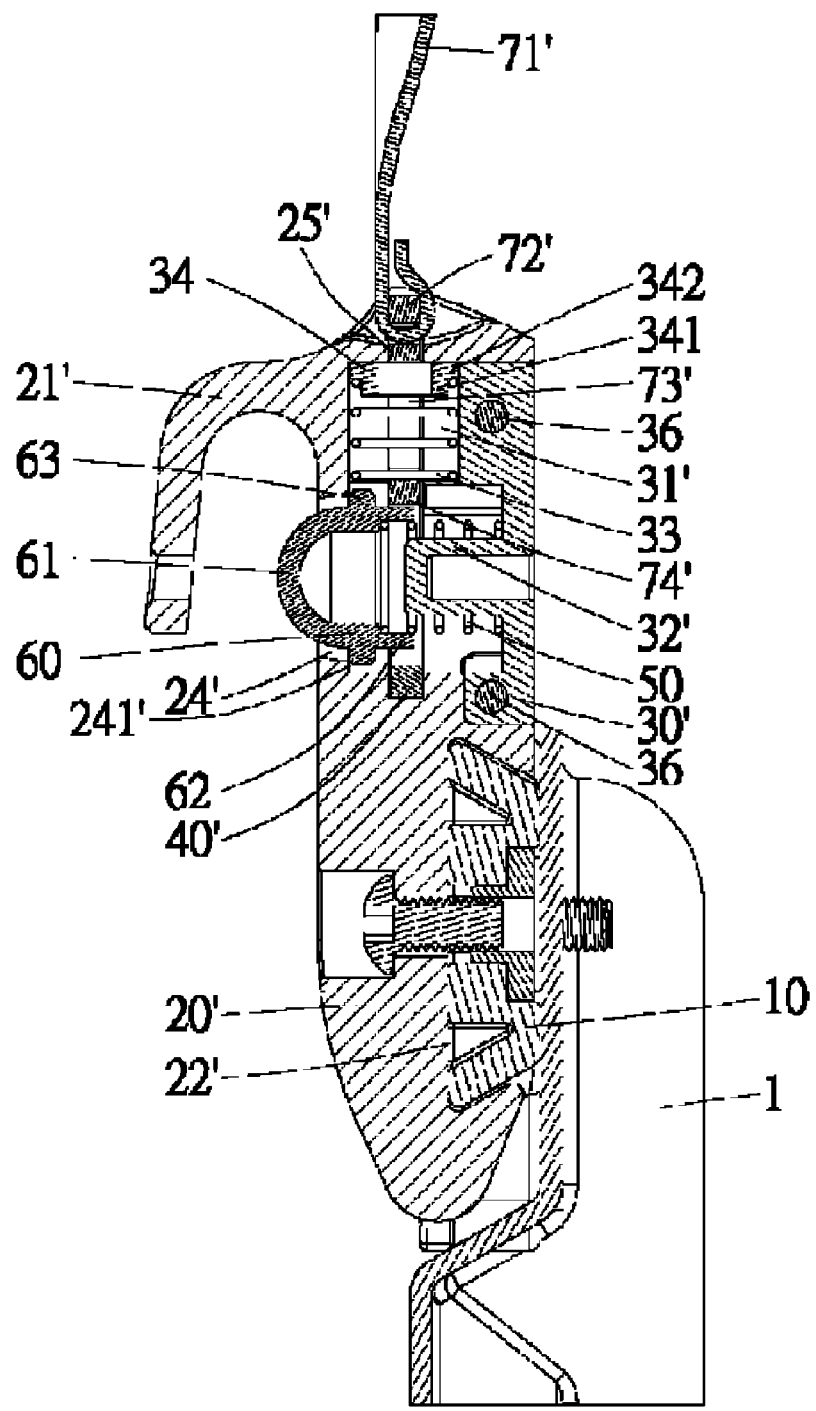
FIG. 14 is a cross-sectional view of the device in another position than shown in FIG. 13.
Figure 15:
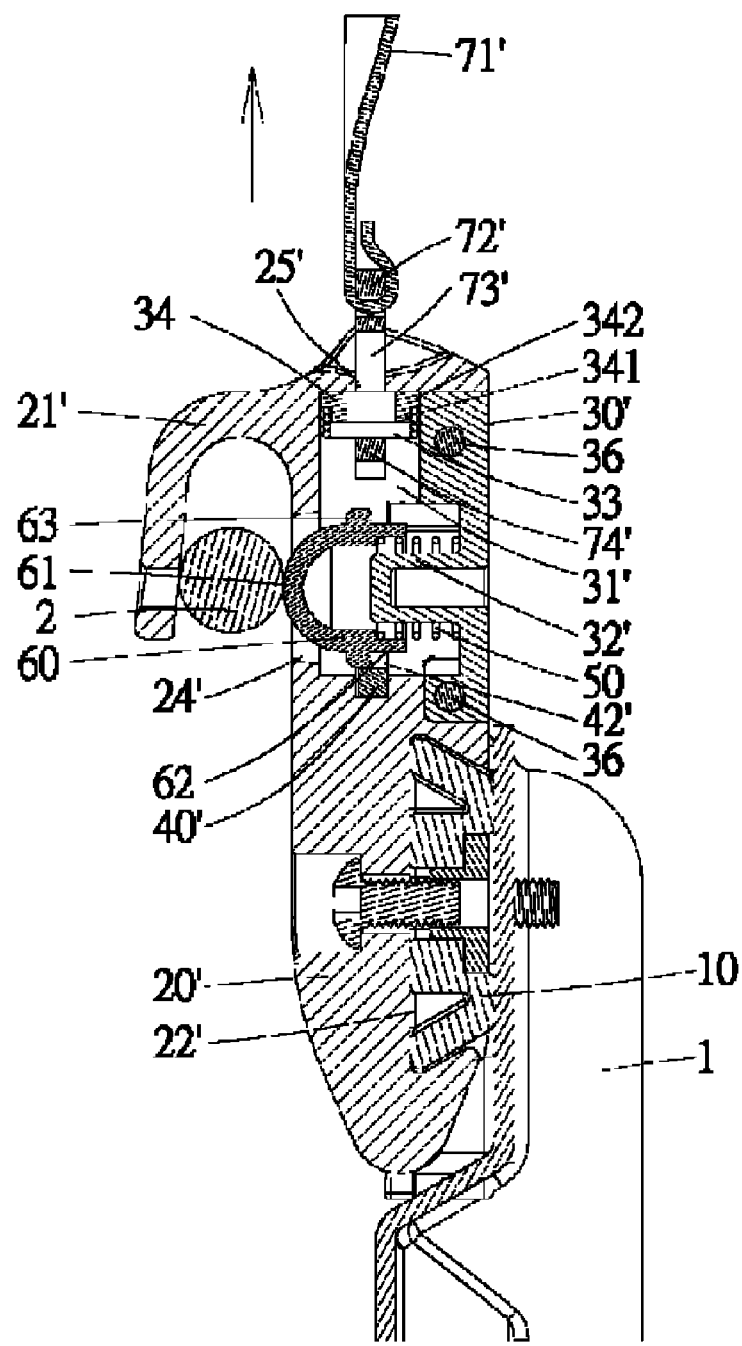
FIG. 15 is a cross-sectional view of the device in another position than shown in FIG. 14.

Referring to FIGS. 14 and 15, the upper shackle 72's is moved to an upper position so that the arched lower edge 74' thereof is removed from the latch 60. The lower shackle 40' is moved to a second position so that the arched portion 43' of the upper edge thereof is removed from the latch 60. The first end 61 of the latch 60 can be retreated into the stepped space 24'. The first end 61 of the latch 60 can be moved past the luggage carrier 2 so that the hooks 20' can be hooked on and removed from the luggage carrier 2.

A strap 70' includes two ends each connected to the upper shackle 72' of a related one of the holding devices. The pulling of the strap 70' causes the lifting of the upper shackles 72'.

Figure 16:
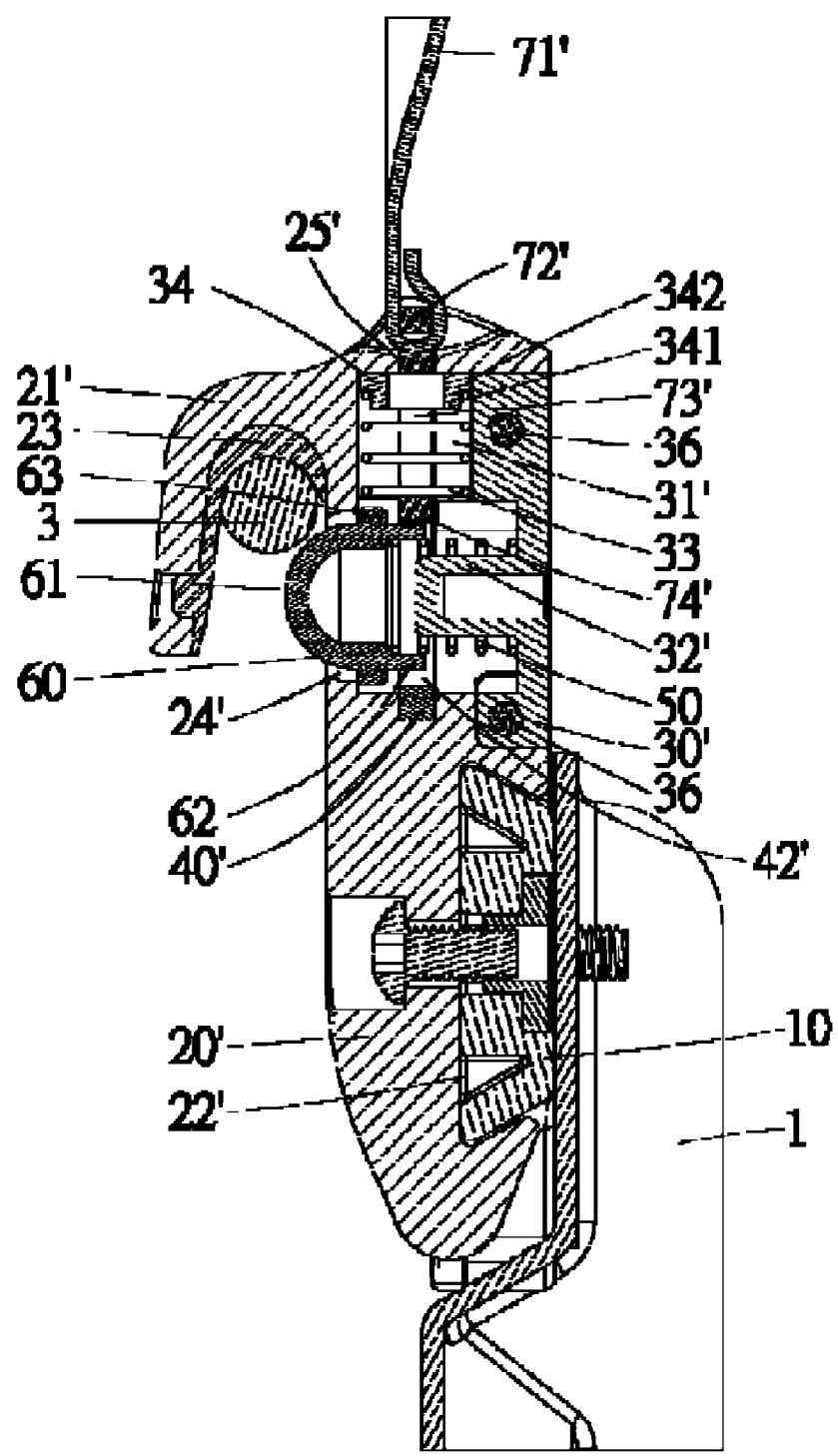
FIG. 16 is a perspective view of a device for attaching a bag to a luggage carrier of a bicycle according to the fourth embodiment of the present invention.

Referring to FIG. 16, there is shown a device according to a fourth embodiment of the present invention. The fourth embodiment is like the third embodiment except including an auxiliary hook 23 attached to each of the hooks 20' so that it can be hooked on a smaller luggage carrier.

The primary advantage of the device according to the present invention is the security in the operation thereof.

The present invention has been described via the illustration of the embodiments. Those skilled in the art can derive variations from the embodiments without departing from the scope of the present invention. Therefore, the embodiments shall not limit the scope of the present invention defined in the claims.

What is claimed is:

1. A device for attaching a bag to a luggage carrier of a bicycle, the device comprising:
   a beam secured to the bag;
   two hooks installed on the beam to hook the luggage carrier; and
   a restraining unit comprising:
   a plate formed on the beam;
   a cover attached to the plate;
   at least one latch movably installed on the plate and formed with a first end and a second end;
   at least one elastic element compressed between the cover and the second end of the latch so that the first end of the latch is exposed from the plate for restraining the luggage carrier;

a shackle movable on the plate between a first position for keeping the first end of the latch exposed from the plate and a second position for allowing the retreat of the first end of the latch into the plate; and a elastic element compressed between the cover and the shackle for keeping the shackle in the first position.

2. The device according to claim 1 wherein the plate comprises at least one collar for receiving the latch.

3. The device according to claim 2 wherein the collar defines a stepped space with an annular shoulder formed on the wall, and the latch comprises an annular flange formed thereon so that the annular flange is restrained between the annular shoulder and the shackle in the first position and can be moved past the shackle in the second position.

4. The device according to claim 3 wherein the plate defines a slot in communication with the stepped space, and the shackle is inserted in the slot so that the annular flange can be moved past the shackle in the second position.

5. The device according to claim 1 wherein the first end of the latch is rounded.

6. The device according to claim 1 wherein the second end of the latch is recessed for receiving the elastic element.

7. The device according to claim 1 wherein the shackle defines at least one cutout through which the annular flange is moved in the second position thereof.

8. The device according to claim 1 wherein the shackle defines a window for receiving the elastic element.

9. The device according to claim 1 wherein the shackle comprises a tab in contact with the elastic element.

10. The device according to claim 1 comprising a pusher located between the shackle and the cover.

11. The device according to claim 1 wherein the cover comprises at least one rod inserted in the elastic element.

12. The device according to claim 1 wherein each of the hooks defines a dovetail groove for receiving the beam so that each of the hooks is movably installed on the beam.

13. The device according to claim 1 wherein each of the hooks comprises a retroflex portion for hooking the luggage carrier.

14. A device for attaching a bag to a luggage carrier of a bicycle, the device comprising:

a beam secured to the bag;

two hooks installed on the beam to hook the luggage carrier; and two holding devices each comprising:

a cover attached to the hook;

a latch movably installed on the hook and formed with a first end and a second end;

a elastic element compressed between the cover and the second end of the latch so that the first end of the latch is exposed from the hook for restraining the luggage carrier;

a lower shackle movable on the hook between a first position for keeping the first end of the latch exposed from the plate and a second position for allowing the retreat of the first end of the latch into the plate;

an upper shackle movable on the hook between a first position for keeping the first end of the latch exposed from the plate and a second position for allowing the retreat of the first end of the latch into the plate; and an elastic element compressed between hook and the upper shackle for keeping the upper shackle in the first position.

15. The device according to claim 14 wherein the hook defines a stepped space with an annular shoulder formed on the wall, and the latch comprises an annular flange formed thereon so that the annular flange is restrained between the annular shoulder and the lower and upper shackles in the first position and can be moved past the lower and upper shackles in the second position.

16. The device according to claim 15 wherein the hook defines a slot in communication with the stepped space, and the lower shackle is inserted in the slot so that the annular flange can be moved past the lower shackle in the second position.

17. The device according to claim 15 wherein the hook defines a slot in communication with the stepped space, and the upper shackle is inserted in the slot so that the annular flange can be moved past the upper shackle in the second position.

18. The device according to claim 14 wherein the upper shackle defines a window for receiving the elastic element.

19. The device according to claim 14 comprising a pusher located between the shackle and the cover.

20. The device according to claim 14 comprising a strap for connecting the upper shackles of the holding units to each other.

* * * * *